Oct. 28, 1969     A. V. FRAIOLI     3,475,226
COMBINATION ELECTRICAL FEED-THROUGH AND FILLING TUBE
USED IN CONJUNCTION WITH A BATTERY CASE
Filed April 14, 1967     2 Sheets-Sheet 1
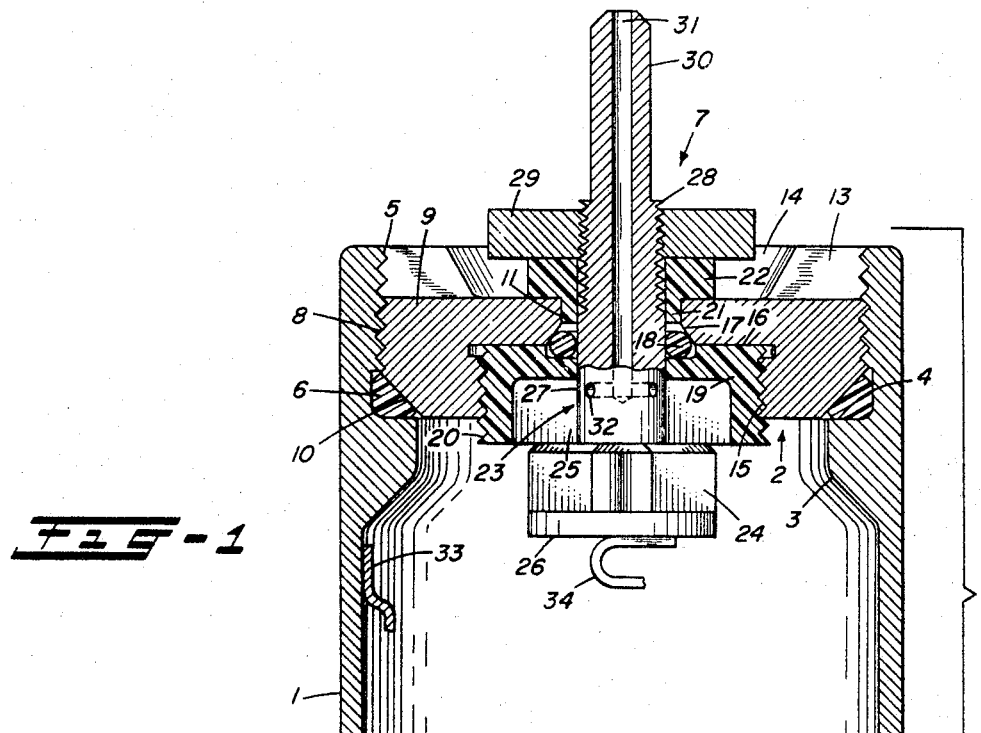
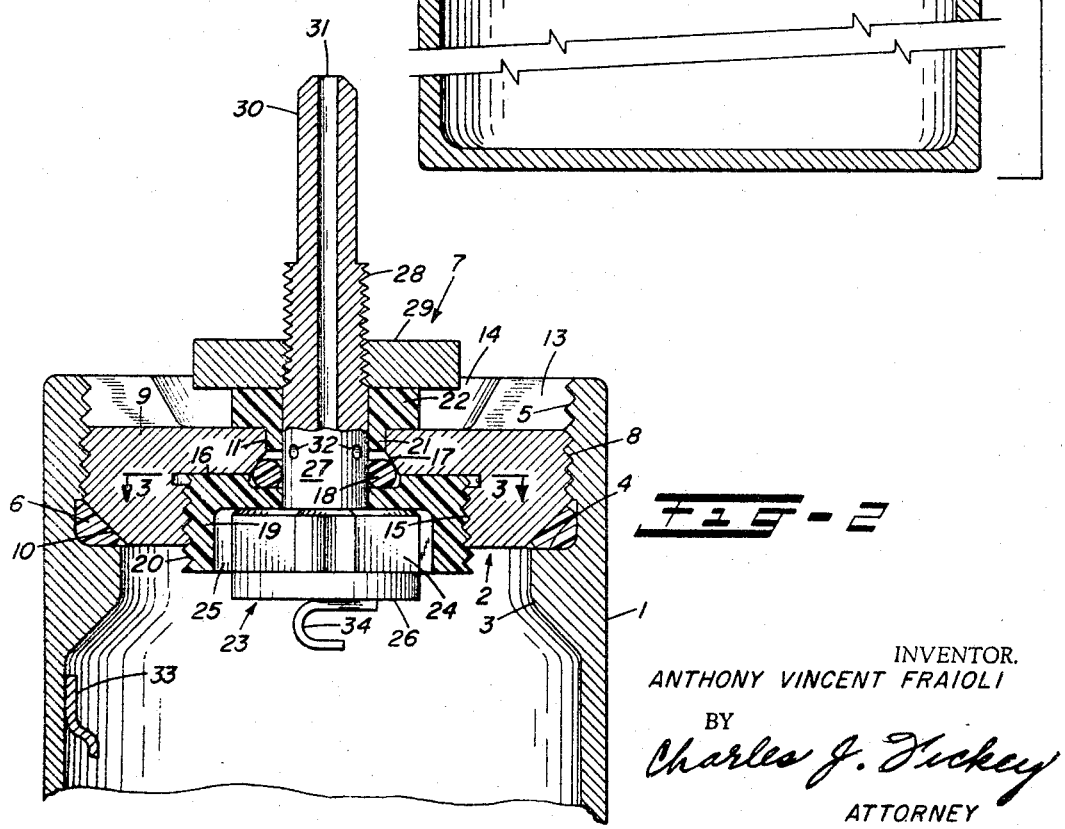
INVENTOR.
ANTHONY VINCENT FRAIOLI
BY
Charles J. Hickey
ATTORNEY Oct. 28, 1969          A. V. FRAIOLI          3,475,226
COMBINATION ELECTRICAL FEED-THROUGH AND FILLING TUBE
USED IN CONJUNCTION WITH A BATTERY CASE
Filed April 14, 1967          2 Sheets-Sheet 2

INVENTOR.
ANTHONY VINCENT FRAIOLI
BY
Charles J. Hickey
ATTORNEY

United States Patent Office 3,475,226
Patented Oct. 28, 1969

3,475,226
COMBINATION ELECTRICAL FEED-THROUGH AND FILLING TUBE USED IN CONJUNCTION WITH A BATTERY CASE
Anthony Vincent Fraioli, Essex Fells, N.J., assignor to American Cyanamid Company, Stamford, Conn., a corporation of Maine
Filed Apr. 14, 1967, Ser. No. 630,998
Int. Cl. H01m 7/00, 17/02
U.S. Cl. 136—162          3 Claims

ABSTRACT OF THE DISCLOSURE

Hermetically sealed dry battery case having closure means to pass fluids without exposure of the cell interior to the atmosphere.

---

Figure 3:
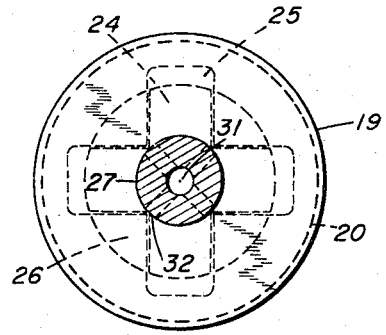

This invention relates to a battery case for batteries incorporating a fluid. The invention more particularly relates to such a battery case having a fluid tight operable closure for passing fluid between the exterior and interior of the battery case.

Various types of high energy batteries are known which make use of a fluid electroylte and/or depolarizer fluid. The fluid can be in the form of a liquid or gas or an admixture of both. One type of cell is that disclosed in commonly assigned copending application, Ser. No. 589,237, filed Oct. 25, 1966 which is now abandoned.

The electrochemical cell in its essential form comprises an anode of a metal capable of reducing sulfur dioxide, a cathode of a material substantially inert to sulfur dioxide but on which sulfur dioxide is reducible, said anode and cathode being immersed in a mixture of sulfur dioxide solution and an electrolyte salt substantially inert to sulfur dioxide and to the anode metal, wherein the sulfur dioxide solution is the sole cathode depolarizer.

By "sulfur dioxide solution" is meant liquid sulfur dioxide (superatmospheric pressure or low temperature system) or a liquid cosolvent admixed with, e.g., substantially saturated by gaseous sulfur dioxide at atmospheric pressure, or systems comprising mixtures of sulfur dioxide and cosolvent wherein the sulfur dioxide is substantially in excess, i.e., wherein the sulfur dioxide is the primary solvent, at superatmospheric pressure.

In one embodiment the cell employs an alkali metal anode, alkali metal electrolyte, particularly lithium or sodium, and a large surface area carbon cathode.

Other anode metals are for example potassium and the alkaline metals such as beryllium, magnesium, calcium, strontium, and barium. Less active metals may also be used such as rubidium, cesium, aluminum and transition metals having reduction potentials in a non-aqueous system more negative than sulfur dioxide such as zinc, tin, manganese, chromium, gallium, indium and the like. The foregoing metals may be employed alone, in mixtures or alloys of two or more, or in other forms such as powders and compacts alone or over a conducting or semiconducting substrate.

Other cathode materials are metals of the platinum family including platinum, iridium, osmium, palladium, rhodium and ruthenium; carbon in any of its common electrode forms such as sintered, compacted or powdered graphite or carbon rod, alone or over platinum; iron in various forms, particularly as stainless steel; and nickel, silver, mercury, lead and gold. Less preferred materials are metals of the families of titanium, vanadium, chromium, manganese and iron (Groups IV–B, V–B, VI–B, VIII–B, and VIII of the Periodic Table); in alloys: copper, zinc, cadmium, germanium, tin, antimony and bismuth; certain nitrides such as boron nitride; and semiconductors such as silicon-containing substances. These materials may take any of the many forms conventional in the art such as rods, compacts, powders, pastes, and the like. Also carbon in its many high surface area forms, e.g., graphite, acetylene black, carbon black, and amorphous carbon; powdered platinum, aluminum and tantalum; and combinations of the foregoing, such as carbon paste over a screen of platinum, aluminum, or other conductor.

Electrolyte salts which are particularly useful because of their exceptionally high conductivity, solubility in the sulfur dioxide solution and relative inertness to the electrode materials are tetraalkylammonium, particularly tetra(loweralkyl)-ammonium, salts of halogens such as chlorine, fluorine, and bromine; tetraalkylammonium salts of organic acids such as trichloroacetic, trifluoroacetic, benzoic, formic, para toluene sulfonic acid, and the like; and the tetraalkylammonium tetrafluoroborates, hexafluoroarsenates, hexafluorophosphates, hexafluorosilicates, monofluoroacetates, chloroaluminates, and bromoaluminates. Nonlimiting examples of such salts are tetraethylammonium chloride, tetraethylammonium acetate, tetrapropylammonium tetrafluoroborate, tetrapolyammonium hexafluorosilicate and tetraethylammonium tetrachloroaluminate.

Other operable electrolyte salts include tetraalkylammonium and metal salts of organic acids such as oleic, oxalic, palmitic, propionic, stearic, succinic, valeric, cinnamic; metal halides; metal cyanates and thiocyanates; metal sulfites and sulfamates; and metal nitrates, dicyanimides and tricyanomethides.

The relative proportions of sulfur dioxide, electrolyte salt and cosolvent are a matter of choice depending on the solubility of the components in each other at a given temperature and pressure. Preferably, sufficient amount of sulfur dioxide are employed to substantially saturate the cosolvent and to provide the maximum amount of cathode depolarizer (sulfur dioxide). The relative and total amounts of sulfur dioxide, cosolvent and electrolyte salt will be such as to substantially dissolve the electrolyte salt and to achieve substantial mutual solubility as well as to provide a usual specific conductivity.

When a cosolvent is employed, as in a room temperature-atmospheric pressure system, the cosolvent my be first saturated with the gaseous sulfur dioxide and the electrolyte salt added, or the salt may be dissolved in the cosolvent and sulfur dioxide bubbled through the mixture. Complete saturation with sulfur dioxide is not critical for a given electrolyte and cosolvent, concentrations of sulfur dioxide substantially less than saturation values at various temperatures and pressures contribute to a useful specific conductivity and cathode current density. Alternatively, systems containing amounts of sulfur dioxide greater than that required for saturation at atmospheric pressure may also be employed although such systems must be maintained at superatmospheric pressure.

Alternatively, the use of a cosolvent may be avoided by employing liquid sulfur dioxide under the requisite superatmospheric pressure or at a liquefying temperature and atmospheric pressure. Such a system is advantageous due to the greater proportion of sulfur dioxide utilized per unit volume and weight of cell and more intimate contact of the sulfur dioxide with the cathode. Substantially the same relative and total amounts of liquid sulfur dioxide and electrolyte salt will be employed as described above with reference to the atmospheric pressure-dissolved sulfur dioxide system. If desired, a cosolvent may also be employed in this system to aid conductivity and dissolution of electrolyte salt but such, of course, is not required.

In the construction of the cells or batteries of the type described, a large variety of cell enclosure materials is available, including inert materials such as glass, high density polyethylenes, polypropylenes, polytetrafluoroethylenes or the like. The cell is generally constructed so as to permit maintaining an inert atmosphere within the cell closure while excluding atmospheric moisture, nitrogen and oxyen. Inert gases such as argon xenon and helium may be used for this purpose. Suitable means should be provided for the addition and exit of the desired gases and for the insertion of the electrodes. The electrodes are constructed of the conductive materials noted above. In a typical embodiment, the anode is inserted as a coil, plate or sheet of metal or it may be a bed of a saturated metal amalgam. When a superatmospheric pressure system is desired, the enclosure, of course, will be maintained pressure-tight at the required liquefying pressure for sulfur dioxide.

Other aspects of cell construction such as the geometry of arrangement of electrodes within the cell closure and size of electrodes are routine considerations and form no part of the present invention.

The cells or batteries may also be constructed as so-called "reserve" cells or batteries. These are power supplies which are manufactured and then stored in a form that insures inertness until a specific action is taken by the user. In a simple form, the electrolyte may be separated from the sulfur dioxide and battery plates and later added when activation is desired. Activation of such reserve cells or batteries may be effected by filling of a cell or battery with sulfur dioxide and/or electrolyte.

Such cells may be manufactured in separate operations, where the electrodes are installed in the cell casing in one operation and the cell is filled with the necessary fluids in another and separate operation. A period of time may elapse between these operations. Since the electrodes should not be exposed to the atmosphere, the first operation will take place in a dry box in an inert atmosphere such as argon. The cell is hermetically sealed in the dry box. It is then necessary to have a convenient means to permit filling of the cell with the electrolyte and $SO_2$ solution without permitting the atmosphere to make contact with the cell interior.

It is therefore an object of this invention to provide a casing for a dry battery having a closure hermetically sealing the battery and capable of passing fluids while maintaining the hermetic seal.

A further object is to provide a dry battery casing whereby the electrodes may be installed in one step and battery fluids in another separate step while maintaining a hermetic seal.

Another object is to provide a hermetically sealed dry battery having a closure through which fluid may be passed when desired.

These and other objects of the invention will become apparent as the description thereof proceeds.

The above objects may be attained by the use of the invention which provides a casing of a conductive material inert to the fluids in the battery having a closure comprising a filler tube of the same or different material axially movable from a position where openings in the tube provide a passage between the interior and the exterior of the cell, and a closed position. At the closed position, the cell is hermetically sealed from the atmosphere. The filler tube may be moved from a closed to open position while attached to a filling apparatus. The casing is in electrical contact with one of the electrodes, and the tube may be in contact with the other electrode, thus insulation is provided between these two parts.

Figure 4:
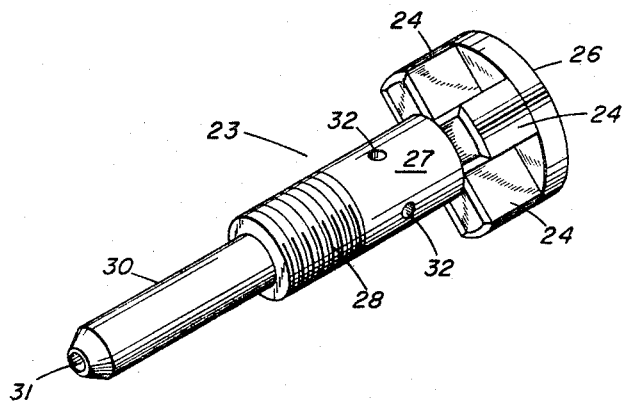

The invention may be better understood by reference to the drawings which represent one embodiment of the invention, in which:

FIGURE 1 is a cross-sectional view of the battery in elevation taken on the axis of the closure, showing the closure valve in an open position, FIGURE 2 is a view similar to FIGURE 1, showing the closure valve in a closed position, FIGURE 3 is a cross-sectional plan view taken along the lines 3—3 of FIGURE 2, showing an enlarged view of a part of the closure assembly with the valve in a closed position, FIGURE 4 is a view in perspective of the sealing valve element of the closure.

Referring in greater detail to the drawings, casing 1 is cylindrical in form closed at the bottom and having opening 2 at the top. Casing 1 may be made of any conductive material which is inert to the battery filling fluids, such as stainless steel, for example, steel coated with the tin or lead on the inner surfaces, and the like. At the opening 2, casing 1 is provided on the inner surface with a flanged portion 3 having a shoulder 4 on the upper side. Threads 5 are provided on the inner surface of casing 1 above shoulder 4 and extending to the end of casing 1. An O-ring gasket 6 fits on shoulder 4, and the closure assembly 7 is screwed into casing 1 by means of threads 8 on circular top plate 9. Plate 9 is turned down until beveled edge 10 on the lower face of the plate compresses O-ring 6 to form a hermetic seal at the junction of plate 8 and casing 1.

The closure assembly 7 is composed of plate 8, as described above which has an axial bore 11 opening from the top surface, and key slots 13 by means of which the closure assembly is turned into the casing. A circular depression 14 is cut out of the top of plate 9. On the lower surface, plate 9 has an axial bore 15 larger than bore 11 and threaded to form a shoulder 16. The edge at bore 11 and shoulder 16 is beveled to form a compression surface 17. Plate 8 is of the same or a similar material as casing 1. An O-ring gasket 18 is fitted to surface 17 and an insulating sleeve 19 having threads 20 is fitted into bore 15 against shoulder 16. An insulating sleeve 21 is slidably fitted in bore 11 and rests against the upper surface of plate 9 by means of a flange 22. Both sleeves 19 and 21 have an axial bore the same size for receiving the closure valve tube 23.

O-rings 4 and 18 are of any siutable material which is inert to and retains its compressibility when in contact with the battery filling fluids. For example, Viton (E. I. du pont de Nemours, a linear copolymer of vinylidine fluoride and hexafluoro-propylene of about 65,000 molecular weight, about 65% fluorine); butyl rubber and ethylene propylene rubber have been found to be suitable materials. Sleeves 19 and 21 are made of a suitable non-conductive material which is inert to the filling fluids and will not swell in contact with the fluids or imbibe the fluids, and which is not deformable in compression. Suitable materials for the sleeves are for example, nylon, polyethylene, polypropylene, and the like.

Valve 23 is of a conductive material the same or similar to casing 1 and plate 9. Valve 23 has branching projections 24 at the lower end adapted to fit into recesses 25 in sleeve 19 when valve 23 is in the closed position shown in FIGURE 2. Valve 23 terminates at the lower end in a circular plate 26. The stem of valve 23 has a section 27 slidably fitted in sleeves 19 and 21. Above section 27, valve 23 has threaded section 28 adapted to receive a threaded nut 29. Above threaded section 28, valve 23 is adapted to be connected at its upper termination 30 by any suitable connection to any suitable filling device (not shown). Valve 23 has a conduit 31 extending axially from the upper end to a point above the projections 24. Radial bores 32 communicate from section 27 of valve 23 to conduit 31.

Casing 1 is electrically connected to the anode or cathode (not shown) by connector 33, and valve 23 is electrically connected to the cathode or anode (not shown) by connector 34. Thus, the electrical terminals on the outside of the cell are casing 1 and valve 23 which are electrically separated by insulating sleeves 19 and 21.

In the production of the cell, the closure assembly 7 is put together as shown in FIGURE 2 with valve 23 in a closed position where projections 24 are in recesses 25 of sleeve 19. Nut 29 is turned down so that it presses sleeve 21 causing it to slide in bore 11 and compress O-ring 18 to form a hermetic seal between plate 9 and section 27 of valve 23. At this point, it will be noted that bores 32 are above this hermetic seal.

Casing 1, with closure assembly 7 removed, is fitted with the necessary anodes and cathodes in a dry box under an argon atmosphere, and connectors 33 and 34 are attached to casing 1 and plate 26, respectively. Assembly 7 is then turned into threads 5 until O-ring gasket 6 is compressed and forms a hermetic seal between casing 1 and plate 9, as shown in FIGURE 2.

Thus an opening is provided for placing the electrodes in the cell by means of opening 2 closed by plate 9. Closure of plate 9 is provided by valve 23 which is also the electrode connection. Electrical separation between casing 1 and the connection of valve 23 is provided by sleeves 19 and 21. Hermetic sealing between the conductive parts is provided by O-rings 4 and 18. In this dry condition, the cell may be stored indefinitely without any effect on the electrodes.

When the cell is to be filled with the required fluid, section 30 of valve 23 is connected to the filling means. Nut 21 is turned up threads 28 to the position shown in FIGURE 1. Valve 23 is then pushed down, section 27 sliding in sleeves 19 and 21 until nut 29 again touches flange 22 of sleeve 21. At this point, bores 32 are in communication with recesses 25 in sleeve 19, and valve 23 is rotated approximately 45° until projections 24 are clear of the recesses. This provides clear access for fluid valve opening 31 to bores 32, through recesses 24 and into the cell. Tightening nut 29 locks the sleeve assembly in compression.

Valve 23 is readily retained in the opened position shown in FIGURE 1 since nut 21 prevents further downward movement, and projections 24 prevent upward movement when they are in the rotated position out of alignment with recesses 24. With valve 23 open, the cell is first evacuated, i.e., the argon gas or other inert gas is pumped out then it is back filled with the electrolyte fluid to the required pressure.

When filling of the battery is complete, nut 29 is loosened, valve 23 is rotated until projections 24 are aligned with recesses 25. Valve 23 is then slidably moved in sleeves 19 and 21 up to the position shown in FIGURE 2 with projections 24 in recesses 25, bores 32 beyond O-ring 18 and nut 21 is turned down to the position shown in FIGURE 2 to press sleeve 21 against O-ring 18. In this position as previously described, the cell is hermetically sealed. The valve section 30 may then be disengaged from the filling means.

While electrical separation has been shown between plate 9 and valve 23, it could alternatively be provided between plate 9 and casing 1 by means of a double threaded sleeve for example. In this embodiment, electrical connector 34 could be fastened to plate 9 and valve 23 could be of a nonconductive material. Further, valve 23 could be permanently sealed after the battery is filled by cutting off the tube and soldering the opening and also by soldering a metallic cap to plate 9 over the cut off tube.

Thus it may be seen that means is provided for passing fluids into a hermetically sealed cell without exposing the cell to the atmosphere. While we have indicated that the valve 23 is used for filling a cell, it is obvious that it could be used for testing or pressure monitoring a cell where this is necessary.

The size of the battery casing is not critical and it may be any desired size. The present invention is well adapted to form a cell of the conventional D-size used in flashlights for example. Moreover, while the cell has been described as having a cylindrical casing, it will be obvious that other shaped casings could be used so long as means are provided to compress O-ring gasket 4 to form a hermetic seal. Where plate 9 is not circular, other retaining means can be used to provide the necessary gasket compression.

Thus, while I have set forth certain specific embodiments and preferred modes of practice of the invention, it will be understood that this is solely for purposes of illustration and that various changes and modifications can be made in the invention without departing from the spirit of the disclosure or the scope of the appended claims.

I claim:

1. A battery which comprises an anode and a cathode in a hermetically sealed container, said container comprising a casing enclosure assembly, said assembly having a filling tube valve sealingly mounted therein which is axially movable between an open position and a closed position to permit the addition of a fluid into said battery.

2. A battery which comprises an anode and a cathode in a hermetically sealable casing enclosure assembly comprising a filling valve sealingly mounted therein and mechanically operable between a closed position at which communication through said valve is sealed and an open position at which communication through said valve permits passage of fluid through said casing enclosure assembly, and wherein said filling valve comprises a valve stem which defines a tubular conduit with inner and outer conduit openings in said valve stem and which valve stem is movable within a casing enclosure seal between said open position at which said inner conduit opening is inside the sealed enclosure and said closed position at which said inner conduit opening is outside the sealed enclosure; the outer conduit opening in said valve stem being outside the sealed enclosure at both said open and closed positions.

3. A battery defined by claim 2 wherein said filling valve comprises one electrically conductive member and said casing enclosure assembly comprises still another electrically conductive member electrically insulated from said one conductive member, the defined conductive members providing respective exterior terminals on said battery for the cathode and the anode.

References Cited

UNITED STATES PATENTS

| | | |
|---|---|---|
| 1,644,017 | 10/1927 | Hendry. |
| 2,746,647 | 5/1956 | Efford et al. __ 222—402.24 XR |
| 2,992,289 | 7/1961 | Meyers _____ 136—90 |

WINSTON A. DOUGLAS, Primary Examiner

D. L. WALTON, Assistant Examiner

U.S. Cl. X.R.

136—114